United States Patent [19]

Van Essen et al.

[11] 3,855,484

[45] Dec. 17, 1974

[54] ELECTRONIC CIRCUIT ARRANGEMENT

[75] Inventors: Hendrik Arie Van Essen; Arie Slob; Johannes Paulus Lambertus Lagerberg, all of Eindhoven, Netherlands

[73] Assignee: U.S. Philips Corporation, New York, N.Y.

[22] Filed: Mar. 14, 1973

[21] Appl. No.: 340,958

[30] Foreign Application Priority Data

Mar. 25, 1972 Netherlands ....................... 7204035

[52] U.S. Cl. .............. 307/296, 307/235 A, 307/303

[51] Int. Cl. ............................................ H03k 17/00

[58] Field of Search ............ 307/296, 297 A, 310 R, 307/235, 303

[56] References Cited

UNITED STATES PATENTS

| | | | |
|---|---|---|---|
| 3,388,293 | 6/1968 | Petschauer | 307/296 X |
| 3,621,302 | 11/1971 | Pricer | 307/296 X |
| 3,633,051 | 1/1972 | Press et al. | 307/296 |
| 3,643,231 | 2/1972 | Lohrey et al. | 307/296 A |
| 3,725,789 | 4/1973 | Mager | 307/310 |

*Primary Examiner*—Rudolph V. Rolinec
*Assistant Examiner*—B. P. Davis
*Attorney, Agent, or Firm*—Frank R. Trifari

[57] ABSTRACT

The product of dissipation and delay time is often substantially constant in logic circuits. In the active state, a logic circuit has a higher switching speed and dissipation than in the non-active state. The clock receives the same power supply so that the clock pulse frequency can be automatically adapted to the speed of the other components. Notably when use is made of integrated injection logic in portable apparatus, a saving can be achieved as regards consumption of battery energy, while the circuit itself is hardly more complex.

2 Claims, 5 Drawing Figures

ELECTRONIC CIRCUIT ARRANGEMENT

The invention relates to an integrated circuit arrangement, comprising a circuit having at least one electrical information input, logic gates and at least one connection for a supply source for the power supply of the logic gates. The current of the supply source in said connection is controllable to a first value under the control of a first signal to a control input of control means. Current outputs of the control means are connected to current inputs of the circuit. The current of the supply source in said connection is controllable to a stand-by value by means of a second signal to said control input. It is known from the Netherlands Patent Application 6,908,154 corresponding to U.S. Pat. No. 3,671,946 in the name of Applicant to switch a memory circuit, notably a bistable trigger stage, from a steady-state of low dissipation and small input current, to a state of high dissipation for writing or reading, resulting in a large input current. The switching of the transistors between the "conducting" and the "cut-off" state requires time because the parasitic capacitances between the electrodes of the transistors must be charged and discharged, respectively. In order to increase the switching speed, a larger current is desired because the product of switching time and adjusted current is approximately constant. The adjusted current is determined by the quotient of the supply voltage across a series resistor and the value of this resistor. Consequently, the product of overall dissipation and switching time is also substantially constant. Therefore, a small switching time requires a high current. According to the said U.S. Pat. No. 3,671,946, the object: fast reading and writing, and little dissipation in the stand-by state is achieved. The advantage of low dissipation is twofold: in an apparatus with a battery supply, lightweight batteries can be incorporated, and in an apparatus which are supplied from the mains an excessively high temperature is avoided.

If information is not only to be stored but also to be processed, similar arguments apply, and in order to realize synchronization, the invention is characterized in that a current output of said control means is connected to a current input of a clock which controls the circuit, the clock frequency being variable together with the value of the current of the supply source. As a result of the first value of the current, operations on the information can be very quickly performed. As a result of the second signal, a second current range is adjusted. The stand-by current value is lower than the first value, so that no operations can be performed at the said high speed when the circuit is in its stand-by mode. If the current were completely switched off so as to save energy, information would be lost: this is not so in this case. The stand-by current value can be used in different situations. A first example is a case where no, or only minor requirements are imposed as regards the processing capacity of the circuit. As a result, the processing of the information is not significantly delayed, while a substantial amount of energy is saved. Another possibility is to derive the power supply from the mains and to provide also an emergency supply source, for example, a battery. The signal on the output terminal can then indicate whether or not the mains supply is adequate. In the latter case, the battery can be made to supply the stand-by current by means of the control means. Furthermore, the clock frequency is then automatically adapted by the current variation under the control of the control means. This can mean, for example, adapted to the achievable information processing speed in the remaining part of the integrated circuit.

One aspect of the invention is that the clock signals of the clock can be blocked by the said second signal. In that case no information is processed at the stand-by current value, but only at the first value of the current. In that case a clock frequency which is substantially reduced with respect to the standard value need not be taken into account.

A further aspect of the invention is that a transition detector is provided by means of which transitions between said first and second signal can be detected, the output signal of the said detector being capable of blocking the clock signals of the clock. Such a transition detector can comprise a simple differentiating element. It can be actuated in response to said first or second signal as well as in response to the values of the current of the supply source. It can be actuated in response to any change, or at a given amount of charge; it can effect the blocking of clock signals for a fixed period of time or for the period during which the level is exceeded. The object of this step is to allow the use of components with larger tolerances; a substantially constant clock frequency is very advantageous in this respect.

It is a further aspect of the invention that the said connection is connected to an input of a current injector for the current supply of further circuit components of the integrated circuit. A current injector is to be understood to mean a multilayer structure comprising at least three successive layers which are separated from each other by rectifying junctions, including a first layer, referred to as injecting layer, which is separated from the circuit elements to be supplied with current by at least one rectifying junction, and an adjoining second layer of semiconductor material, referred to as intermediate layer. The injecting layer is connected to a supply connection. Charge carriers are injected into the intermediate layer by the injecting layer. The said charge carriers are collected by the third layer of the current injector, adjoining the intermediate layer and are referred to as collecting layer. A zone of one of the circuit elements to be supplied with current, which is referred to as the zone to be adjusted and which is separated from the injecting layer, and hence from the interconnected supply connection, by at least two rectifying junctions, collects charge carriers, via a rectifying junction which bounds this zone, from one of the layers of the current injector and is thus supplied with current. The zone is directly connected to a pattern of conductor tracks.

A structure of this kind has become known as "integrated injection logic," and is described in the previously filed Netherlands Patent Application 7,107,040 corresponding to copending U.S. Pat. application Ser. No. 253,348, filed May 15, 1972. The advantages of this structure are described in detail therein and relate to a simpler construction and a substantially complete absence of adjusting resistors. Furthermore, less conductor tracks are required. As a result, the same number of circuit elements requires a smaller surface area, so the yield is larger. In addition, a large number of transistors can be supplied with current by the same current injectors, with the result that the injected currents are accurately the same. Consequently, the switching times are equal so that the tolerances can be smaller. Particularly if the clock is constructed accordingly, all elements have the same current and the same switching time. The control means can often consist of a single resistor which is selectively bridged by a conducting transistor.

The invention will be described with reference to some figures.

FIG. 5*a* shows a modified embodiment of the clock.

Figure 1:
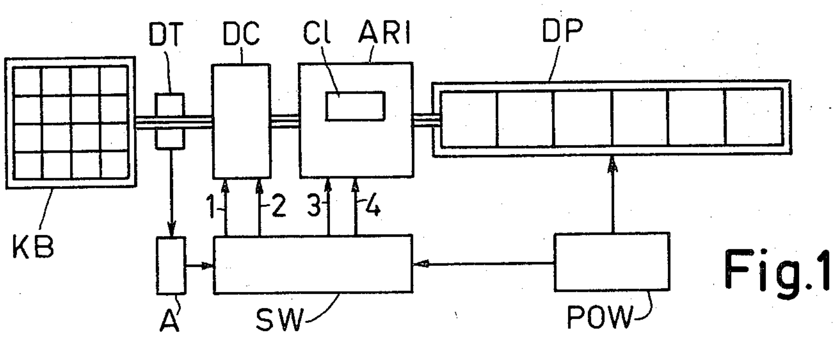
FIG. 1 shows, by way of example, a diagram of a pocket calculator.

FIG. 1 shows a block diagram of a pocket calculator in which a device according to the invention is used. The pocket calculator is an example of an apparatus in which an integrated circuit is provided, comprising information inputs, logic gates and an associated power supply. The invention does not relate to the arithmetical operations in the calculator, so these operations will not be described in this context. The invention can be used in an analogous manner in portable "key-to-tape" equipment, space satellites processing digital signals, sealed error-correction devices in submarine data transport cables, and other devices in which the advantages of the invention— dissipation reduction and energy savings — become apparent. The pocket calculator comprises a housing not shown, a keyboard KB, a display unit DP, control means SW, an amplifier A, and an energy source POW which comprises, for example, a replacable battery.

Also provided are a detector DT, a decoder DC and an arithmetic unit ARI, which are constructed, together or in parts, as an integrated circuit. The energy source POW comprises a switch which is not shown. If this switch is in the position "on," the display unit DP is actuated; this unit comprises, for example, six positions where a number can be displayed by liquid crystals. The control means SW, and hence the decoder DC and the arithmetic unit ARI, are set, via the lines 1 and 3, respectively, to the stand-by current. As a result, the processing speed is substantially limited in these two components. When a button of the key-board KB is depressed, the decoder DC receives a signal therefrom via a multiple cable. Moreover, the depression is signalled by the detector DT. This signal acts as the said first signal, with the result that the control means SW are actuated, via the amplifier A and the decoder DC and the arithmetic unit ARI are controlled by the said first value of the current via the lines 2 and 4, respectively. Consequently, the achievable decoding and calculating speeds are then high. The information of the button is decoded. If the button is a digit button, the information of the digit is stored in a register of the arithmetic unit ARI and is displayed on the display unit DP. If it concerns a function button, the calculation is performed and the result thereof is stored in a register and displayed. The control means SW can be controlled, for example, for 0.5 second by the amplifier A, for example, the longest necessary for an arithmetical operation.

It is alternatively possible that the control of the control means is terminated by a signal from the arithmetic unit ARI itself. For example, it may be that each depressed button changes the number displayed on the display unit DP, either because the digit which was depressed last is (also) displayed, or because the result of the calculation is displayed. The current is then reduced to the stand-by value.

The power consumption of the dislay unit DP is, in practice, for example, 3 mA as long as the switch is in position "on." The first value of the current is, for example, 20 mA for the entire circuit, the stand-by current value for the entire circuit being 2 mA, while at the most one arithmetic operation is started every ten seconds (lasting less than 1/10 second on the average) during normal calculation. The additional current consumption in excess of the stand-by value is then negligible, even if the said fixed control time is 0.5 second.

The depression of a button can be directly detected, for example, in that it is signalled by an interrogation unit (not shown). On the other hand, in the stand-by current range it can be detected that the decoder DC receives information (but reacts only slowly thereto). It is alternatively possible that the information arrives as a flow of bits from a conductor. In that case each signal can be preceded by a "1"-pulse of very long duration. This "1"-pulse changes the current pattern in the circuit, which is detected by a current detector. The output signal of the current detector controls an amplifier which controls the control means. If the network amplification exceeds 1, the amplifier A is saturated and the control means set the current to the first value. Furthermore, it is possible that not all buttons effect the first value of the current. If a digit button, or a button "erase," or a decimal point button is depressed, the desired activity of the calculator is only limited. This applies to a lesser extent to adding and subtracting. Particularly for multiplication, division, root extraction and the line an extensive calculating program is required. Consequently, it may be that the current is set to the first value only in reaction to a command from a few buttons. It is alternatively possible that three or more feasible discrete current values exist. The arithmeric unit ARI furthermore comprises a clock C1 which synchronizes the operations of the remainder of the circuit and which has the same power supply as the circuit. As a result, the clock frequency is adapted to the processing speed which can be achieved in the remainder of the circuit. An example of such a clock and its use will be described hereinafter. The circuit can comprise the elements DT, DC, ARI, A and SW in combined integrated form, However, a plurality of chips can alternatively be used. Even the elements which are shown as one unit need not be constructed as one unit. Finally, the circuit can also comprise non-integrated elements such as output amplifiers, switches and the like.

Figure 2:
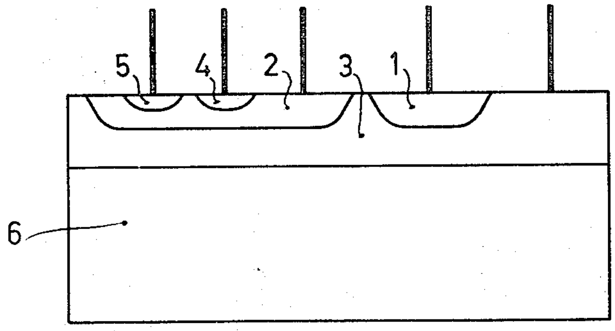
FIG. 2 is a sectional view through a semiconductor structure according to the integrated injection logic principle.

FIG. 2 is a sectional view through a semiconductor structure according to the integrated injection logic principle ($I^2L$). The structure consists of six layers which are manufactured according to techniques which are conventional in integrated circuit technology. Five of these layers are provided with connections which are denoted by heavy lines. Layer 1 is of p-type semiconductor material, and is connected to a supply source. This layer constitutes an injecting layer. Layer 3 is of n-type semiconductor material and is connected to ground. This layer constitutes an intermediate layer in which charge carriers are injected by the injecting layer. This hole current is dependent on the supply voltage applied to the layer 1 (and also on the physical conditions such as the concentration of the elements in the material and the temperature). Layer 6 is of n-type semiconductor material of a higher n-concentration than layer 3. This thicker layer acts a mechanical reinforcement. Layer 2 is of p-type semiconductor material and constitutes a collecting layer. The assembly of the layers 1, 3 and 2 constitutes a current injector comprising three layers, and has a so-termed lateral structure: the three layers are adjacently arranged. In the same manner as layer 1, layer 2 injects a hole current in layer 3 which increases as the potential of layer 2 increases. Layer 1 and layer 2 are deposited together, so that their physical properties are substantially the same. Because they are also spatially arranged together, their temperature is also the same. On the one hand, the combination of layer 1 and layer 3 can be considered as a current source having a high internal resistance (current substantially constant). On the other hand, the current in the direction 1 → 3 → 2 is substantially dependent on the potential of layer 2. If this potential is high, this current is small, notably because composition and temperature of the layers 1 and 2 correspond. If the potential of layer 2 is low, the current in the direction 1 → 3 → 2 is large.

Layers 4 and 5 are of n-type semiconductor material and constitute two collectors of the multicollector transistor which is formed by the layers 3 — 2 — 4 and 3 — 2 — 5 (npn-transistor). If the current in the direction 2 → 3 is large (current in the direction 1 → 3 → 2 small), this transistor is conducting. In that case current can be fed from the layers 4 and/or 5. The potential on layer 2 could be considered as the driving force of this operation; however, it is more logical to consider the current in the direction 2 → 3 as the driving force, so that a current-controlled current logic arises ($I^2L$). Consequently, it is obvious that the structure of the current injector may definitely not be considered as a pnp-transistor, because in this case only the currents are of importance and not the voltages.

Apparently two logic states can be defined:

a. Currents in the directions 1 → 3 and 4(5) → 2 → 3 b. current in the direction 1 → 3 → 2.

The latter can be arbitrarily defined as a logic "1."

The described example of integrated injection logic is only one of many possible examples. In the said Netherlands Patent Application 7,107,040 many examples are described. For example, the current injector (layers 1 — 3 — 2) can be constructed as a vertical structure, and the multi-collector transistor (layers 3 — 2 — 4/5) as a lateral structure. Many other versions are already described in said application.

Figure 3:
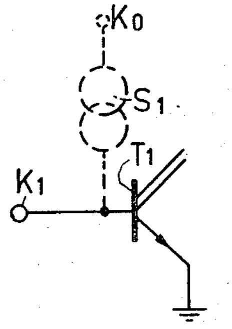
FIGS. 3 and 4 show examples of gates constructed by integrated injection logic.

FIG. 3 shows a gate which is constructed in integrated injection logic, i.e. the same gate as that shown in FIG. 2, but not symbolically represented. Assume that the transistor T1 is composed of the layers 3, 2 and 4/5 of FIG. 2. It is also assumed that the current source S1, comprising the supply connection KO, is composed of the layers 1 and 3 of FIG. 2. Terminal K1 constitutes the signal input and the collectors of the multi-collector transistor T1 form the signal outputs. Considering the foregoing, it is obvious that the transistor can have two logic states:

a. Via terminal K1 current is fed from the collector electrodes of transistor T1, b. No current is fed via K1, but current is fed via the emitter electrode of transistor T1, and in that case current can be fed from the collector electrodes of transistor T1.

If the current-carrying state of the electrodes is defined as the logic 1, the circuit of FIG. 3 constitutes a logic NOT-gate comprising two outputs.

Figure 4:
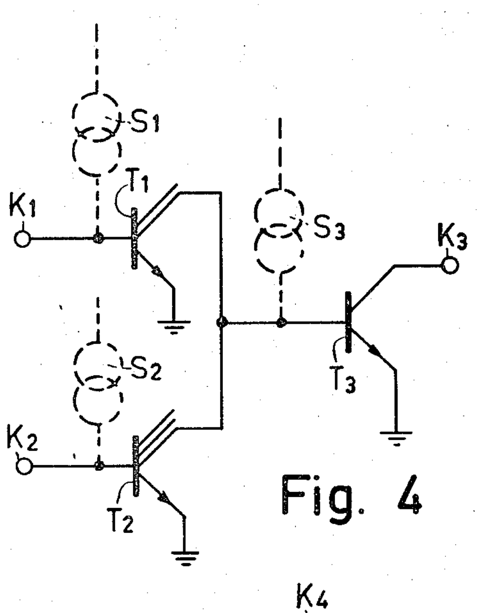

FIG. 4 shows a circuit comprising three transistors T1, T2, T3, corresponding to transistor T1 of FIG. 3, and three signal terminals K1, K2, K3. Connected to the base of these transistors are current sources S1, S2, S3, each of which always supplies the same unity current, the construction of each source being identical to that shown in FIG. 2.

If current is fed via terminal K1 (logic 1), transistor T1 is not conducting. If current is fed via terminal K2, transistor T2 is not conducting. If the current of current source S3 is fed to ground via the emitter electrode of transistor T3, terminal K3 is connected to ground in a conducting manner. This transistor is not cut off only if neither K1 nor K2 pass current. If the current-carrying state of a connection is defined as the logic "1," this is a logic NOR-gate. The galvanic connection between the collector electrodes of the transistors T1 and T2 and the base electrode of transistor T3 can be denoted in the same manner as a logic OR-function. So as to enable the use of the output signal of a gate at different locations, each time a collector electrode of the multi-collector electrode of the multi-collector transistors must be used. Otherwise, the gates would receive different currents on their collector electrodes, with the result that different switching times are liable to occur. However, it is feasible that in given circuits this phenomenon can be used to good advantage.

Figure 5:
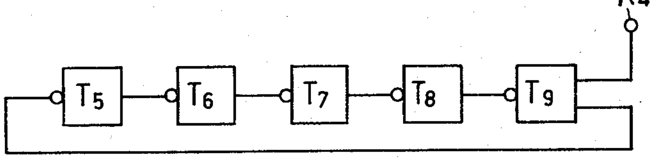
FIG. 5 shows a block diagram of a clock constructed by integrated injection logic.

FIG. 5 shows a block diagram of a clock which is constructed by integrated injection logic and which consists of an odd number of logic gates (in this case 5) corresponding to FIG. 3, T5 . . . T9. The base electrode of a gate which is denoted by a circle is each time connected to a collector electrode of a preceding gate. The circuit is astable and the gates switch each time with the same delay time. The switching is effected if the input signal and the output signal of a gate have the same logic value. A symmetrical output signal thus appears on terminal K4.

If this clock has the same supply voltage in a circuit as the remaining elements which are constructed by the same integrated injection logic (same temperature and composition), the clock frequency can be automatically adapted to voltage and temperature variations. In given circumstances it may be necessary to stop the clock, for example, by means of an additional blocking gate G in the loop conductor T5 . . . 9 as shown in FIG. 5a or by a blocking gate in the output line connected to terminal K4. These gates can be opened when the supply current is sufficiently large, or when the supply current is sufficiently constant. For this purpose a special detector D can be added to the diagram of FIG. 1 as shown in FIG. 5a. The construction of such detectors will be obvious to those skilled in the art. Furthermore, if the clockpulse is blocked, any bistable and polystable elements such as counters incorporated in the circuit can be reset to a starting position, This guarantees a fixed starting position when the supply of clock pulses is restored.

What is claimed is:

1. An integrated circuit arrangement for processing an information signal at a reduced power consumption comprising:

a power supply; an injection logic circuit including logic gates, a clock for controlling the speed of operation of the gates, and connections for current sources for current injectors of the circuit;

means for detecting signal transitions at the input of the circuit to provide a first control signal in response to the occurrence of the information signal and, respectively, a second control signal in response to the termination of the information signal at the input of the circuit; and control means connected between said power supply and said connections and controlled by said detecting means for setting the current of the current sources to a higher value in response to said first control signal and to a lower value in response to said second control signal, whereby the clock varies its frequency proportionally to the current value.

2. An integrated circuit arrangement as claimed in claim 1, wherein said second signal is capable of blocking the clock signals of the clock.

* * * * *